US00RE46756E

(19) United States
(12) Reissued Patent
Lee et al.

(10) Patent Number: US RE46,756 E
(45) Date of Reissued Patent: Mar. 13, 2018

(54) METHOD OF TRANSMITTING/RECEIVING LTE SYSTEM INFORMATION IN A WIRELESS COMMUNICATION SYSTEM

(71) Applicant: LG ELECTRONICS INC., Seoul (KR)

(72) Inventors: Young-Dae Lee, Gyeonggi-Do (KR); Sung-Duck Chun, Gyeonggi-Do (KR); Myung-Cheul Jung, Seoul (KR); Sung-Jun Park, Gyeonggi-Do (KR); Patrick Fischer, Bourg la Reine (FR)

(73) Assignee: LG ELECTRONICS INC., Seoul (KR)

(21) Appl. No.: 14/628,689

(22) Filed: Feb. 23, 2015

Related U.S. Patent Documents

Reissue of:
(64) Patent No.: 8,538,444
Issued: Sep. 17, 2013
Appl. No.: 12/293,805
PCT Filed: Mar. 19, 2007
PCT No.: PCT/KR2007/001335
§ 371 (c)(1),
(2) Date: Sep. 19, 2008
PCT Pub. No.: WO2007/108630
PCT Pub. Date: Sep. 27, 2007

U.S. Applications:
(60) Provisional application No. 60/784,680, filed on Mar. 21, 2006.

(51) Int. Cl.
*H04W 48/12* (2009.01)
*H04L 5/00* (2006.01)

(52) U.S. Cl.
CPC ..... *H04W 48/12* (2013.01); *H04L 5/0064* (2013.01); *H04L 5/0091* (2013.01)

(58) Field of Classification Search
CPC ..... H04W 48/12; H04L 5/0064; H04L 5/0091
(Continued)

(56) References Cited

U.S. PATENT DOCUMENTS 6,574,212 B1 6/2003 Jürgensen et al.
6,628,946 B1 9/2003 Wiberg et al.
(Continued)

FOREIGN PATENT DOCUMENTS

CN 1329802 1/2002
KR 10-2001-0099654 11/2001
(Continued)

OTHER PUBLICATIONS

3GPP "3rd Generation Partnership Project; Technical Specification Group Services and System Aspects; 3GPP System Architecture Evolution: Report on Technical Options and Conclusions (Release 7)" 3GPP TR 23.882 V1.0.0, Mar. 2006.
(Continued)

*Primary Examiner* — Ovidio Escalante
(74) *Attorney, Agent, or Firm* — Lee Hong Degerman Kang Waimey

(57) ABSTRACT

In a wireless mobile communications system, the system information is grouped or classified in different types according to the characteristics of the system information, and the system information is transmitted to channels with specific functions that allow the optimization of the resource usage and the reception by the User Equipment (UE).

6 Claims, 3 Drawing Sheets

(58) Field of Classification Search
USPC ..... 455/450, 179.1, 451, 452.1, 452.2, 464
See application file for complete search history.

(56) References Cited

U.S. PATENT DOCUMENTS

| | | | | |
|---|---|---|---|---|
| 6,643,318 | B1 | 11/2003 | Parsa et al. | |
| 6,975,684 | B1 | 12/2005 | Dabak et al. | |
| 2002/0065091 | A1 | 5/2002 | Choi | |
| 2002/0128035 | A1* | 9/2002 | Jokinen et al. | 455/552 |
| 2003/0054829 | A1* | 3/2003 | Moisio | 455/452 |
| 2003/0095528 | A1 | 5/2003 | Halton et al. | |
| 2003/0186705 | A1* | 10/2003 | Lahav et al. | H04W 16/06 455/451 |
| 2003/0207696 | A1* | 11/2003 | Willenegger et al. | 455/522 |
| 2004/0028014 | A1* | 2/2004 | Goldberg et al. | 370/337 |
| 2004/0148352 | A1 | 7/2004 | Menon et al. | |
| 2004/0152473 | A1* | 8/2004 | Kuwano et al. | H04W 4/06 455/456.2 |
| 2005/0111480 | A1 | 5/2005 | Martin | |
| 2005/0177623 | A1 | 8/2005 | Roberts et al. | |
| 2005/0249141 | A1 | 11/2005 | Lee et al. | H04W 72/005 370/312 |
| 2006/0166693 | A1* | 7/2006 | Jeong et al. | 455/525 |
| 2006/0205413 | A1* | 9/2006 | Teague | 455/452.1 |
| 2007/0015500 | A1 | 1/2007 | Parmar et al. | |
| 2007/0093253 | A1* | 4/2007 | Lindoff | H04J 11/0069 455/450 |
| 2007/0177553 | A1* | 8/2007 | Frederiksen et al. | 370/335 |
| 2007/0211837 | A1* | 9/2007 | Zipper | H04B 1/28 375/350 |
| 2010/0054308 | A1 | 3/2010 | Brisebois et al. | |

FOREIGN PATENT DOCUMENTS

| | | |
|---|---|---|
| KR | 2005-0057926 | 6/2005 |
| WO | 2004/089013 | 10/2004 |

OTHER PUBLICATIONS

Panasonic, "Flexible Transmission of System Information," 3GPP TSG RAN WG2 #55, R2-062792, Oct. 2006, 6 pages.
3rd Generation Partnership Project (3GPP), "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V0.9.0, XP050380380, Mar. 2007, 82 pages.
Panasonic, "RRC Functionalities and location of RRC," 3GPP TSG RAN WG2 #51, R2-060337, XP050130350, Feb. 2006, 8 pages.
3rd Generation Partnership Project (3GPP), "Technical Specification Group Radio Access Network; Evolved Universal Terrestrial Radio Access (E-UTRA) and Evolved Universal Terrestrial Radio Access Network (E-UTRAN); Radio interface protocol aspects (Release 7)," 3GPP TR 25.813 V0.3.0, XP050380363, Jan. 2006, 26 pages.
European Patent Office Application Serial No. 14003148.5, Search Report dated Jan. 23, 2015, 9 pages.
European Patent Office Application Serial No. 07745597.0, Office Action dated Jan. 23, 2015, 7 pages.
3rd Generation Partnership Project, "Technical Specification Group Radio Access Network; Physical Layer Aspects for Evolved UTRA (Release 7)", 3GPP TR 25.814 V1.2.2, Mar. 2006, 104 pages.
European Patent Office Application No. 07745597.0, Office Action dated Sep. 26, 2016, 7 pages.
European Patent Office Application Serial No. 140031485, Office Action dated Nov. 21, 2016, 8 pages.
LG Electronics, "Considerations on BCH and 20 MHz system BW", R2-060903, 3GPP TSG RAN WG1#44/RAN WG2#52, Feb. 2006, 3 pages.
3GPP"3rd Generation Partnership Project, Technical Specification Group Services and System Aspects; 3GPP System Architecture Evolution: Report on Technical Options and Conclusions (Release 7)" 3GPP TR 23.882 V1.0.0, Mar. 2006.
3GPP "3rd Generation Partnership Project; Technical Specification Group Radio Access Network; Radio Resource Control (RRC); Protocol Specification (Release 6)", 3GPP TS 25.331 v6.8.0, Dec. 2005.
Mitsubishi Electric Telecom Europe, "Draft LS about Correction of the PRACH ramp up procedure for collision with FACH measurement occasion avoidance", R1-02-0837, TSG-RAN Working Group 1 meeting #26, May 2002, XP-050096406.
LG Electronics Inc., "UE state transition in LTE_ACTIVE," R2-061002, 3GPP TSG-RAN WG2 #52, Mar. 2006.
Ericsson, "Broadcast of E-UTRA System Information", R1-060091, TSG-RAN WG1 LTE AdHoc, Jan. 2006, 4 pages, XP50417469.
Huawei, "Transport channel structure for LTE", R2-060024, 3GPP TSG RAN2 #50, Jan. 2006, 4 pages, XP50130298.
European Patent Office Application Serial No. 07745597.0, Search Report dated Nov. 6, 2012, 8 pages.
State Intellectual Property Office of the People's Republic of China Application Serial No. 200680040592.3, Certificate issued on Jan. 2, 2013, 1 pages.

* cited by examiner

METHOD OF TRANSMITTING/RECEIVING LTE SYSTEM INFORMATION IN A WIRELESS COMMUNICATION SYSTEM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application is *a reissue application of U.S. Pat. No. 8,538,444, issued on Aug. 28, 2013 and based on U.S. patent application Ser. No. 12/293,805, filed on Sep. 19, 2008, which is* the National Stage filing under 35 U.S.C. 371 of International Application No. PCT/KR2007/001335, filed on Mar. 19, 2007, which claims the benefit of U.S. Provisional Application Ser. No. 60/784,680, filed on Mar. 21, 2006, *the contents of which are all hereby incorporated by reference herein in their entirety.*

DISCLOSURE OF INVENTION

Technical Solution

This disclosure relates to a wireless communication system, more particularly, to a method of transmitting/receiving LTE system information in a wireless communication system.

In the related art, the system information is mainly broadcasted through a channel [i.e., P-CCPCH channel] having a constant data rate in the Universal Mobile Telecommunications System (UMTS). This implies that the transmission of system information has static characteristic. When the system information is transmitted through the fixed radio resources, the network cannot have flexibility for scheduling of data transmission so that it becomes hard to be applicable to the change of radio environment. As such, the transmission of system information is not coordinated between different cells. Therefore, in the case of OFDM, using only one static channel for the transmission of system information would not allow to optimize the transmission or reception of the system information.

This disclosure has been developed in order to solve the above described problems of the related art. As a result, this disclosure provides a method of transmitting and/or receiving the system information on an OFDM air interface in an efficient manner.

Accordingly, this disclosure is directed to a method of transmitting and/or receiving the system information in a mobile communication system that substantially obviates one or more problems due to limitations and disadvantages of the related art.

To implement at least the above feature in whole or in parts, this disclosure may provide a method of broadcasting or receiving the system information in a mobile communication system, the system information is grouped or classified in different types according to the characteristics of the system information, and then the system information is transmitted or received via different types of channels with specific functions that allow the optimization of the resource usage and the reception by the User Equipment (UE), wherein the different types of channels may be a statically scheduled channel and/or a flexibly scheduled channel.

Additional features of this disclosure will be set forth in part in the description which follows and in part will become apparent to those having ordinary skill in the art upon examination of the following or may be learned from practice of this disclosure. The objectives and other advantages of this disclosure may be realized and attained by the structure particularly pointed out in the written description and claims hereof as well as the appended drawings.

One aspect of this disclosure is the recognition by the present inventors regarding the problems and drawbacks of the related art described above and explained in more detail hereafter. Based upon such recognition, the features of this disclosure have been developed.

Although this disclosure is shown to be implemented in a mobile communication system, such as a UMTS developed under 3GPP specifications, this disclosure can also be applied to other communication systems operating in conformity with different standards and specifications.

Figure 1:
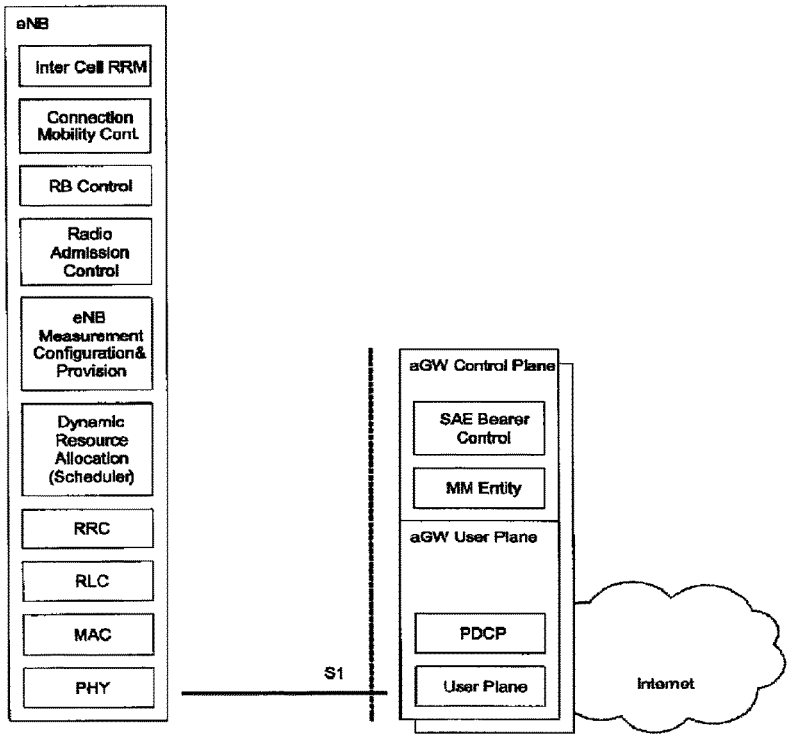
FIG. 1 is an exemplary diagram illustrating protocol architecture of the E-UTRAN.

FIG. 1 is a block diagram of a network structure of an E-UMTS (Evolved-Universal Mobile Telecommunications System) to which technical features of this disclosure may be applied. Recently, an initiative has been started in the scope of the 3GPP ($3^{rd}$ Generation Partnership Project). project to standardize a new air interface for a mobile communication system compared to the second generation air interface (as known under the name of GSM based on TDM (Time division multiplexing) and FDM (Frequency division multiplexing)), and the $3^{rd}$ generation air interface (as known under the name UMTS and based on CDMA (Code division multiplexing)). The new air interface that is currently discussed as LTE (Long Term Evolution) is based on OFDM (Orthogonal Frequency Division Multiplexing). The E-UMTS is a system evolving from the conventional UMTS and its basic standardization is currently handled by the 3GPP.

Referring to FIG. 1, an E-UMTS network includes a user equipment (hereinafter abbreviated 'UE'), a base station (hereinafter named 'eNode B' or 'eNB') and an access gateway (hereinafter abbreviated 'aGW') connected to an external network by being located at an end of the E-UMTS network. The eNB and the aGW are connected via an interface called S1. The aGW may be classified into a part for handling user traffic and a part for handling control traffic. A first aGW for processing new user traffic may communicate with a second AGW for processing control traffic via a new interface. A first interface for transmitting user traffic or a second interface for transmitting control traffic may be located between several eNBs. Here, the eNB may include at least one cell.

The eNB may perform functions of selection for Access gateway (AGW), a routing toward the AGW during a Radio Resource Control (RRC) activation, a scheduling and transmitting of paging messages, a scheduling and transmitting of Broadcast Channel (BCCH) information, a dynamic allocation of resources to UEs in both a uplink and a downlink, a configuration and provision of eNB measurements, a radio bearer control, a radio admission control (RAC), and a connection mobility control in LTE_ACTIVE state.

The functions located in the eNB will be briefly described as follows: the function of 'Inter Cell RRM' may handle the use of the available resources between different cells and eNBs. The function of 'Connection and Mobility Control' may control the maintenance of the connection between the network and a relocation of the UE context in case of mobility. The function of 'RB Control' may maintain radio bearers (RBs) between the UE and the eNB. The radio bearer (RB) is a service provided by the second layer (L2) for data transmission between the terminal and the UTRAN. In general, the setting of the RB refers to the process of stipulating the characteristics of a protocol layer and a channel required for providing a specific data service, and setting the respective detailed parameters and operation methods. The function of 'Radio Admission Control' may provide for services with specific Quality of Service (QoS) requirements to ensure the availability of certain resources. As such, it may be necessary to decide for a requested radio service, when the required resources are available and the admission would not endanger the availability of resources for already admitted services. The function of 'eNB Measurement Configuration and Provision' may provide the eNB to configure measurements in the UE and to provide it with information for performing these measurements. The function of 'Dynamic Resource Allocation' may provide the eNB to allocate the available resources dynamically for the different UEs which are served by the eNB. The radio resource control (RRC) layer may be located at the lowest portion of the third layer (L3) is only defined in the control plane and may control logical channels, transport channels and the physical channels in relation to the configuration, reconfiguration, and release or cancellation of the radio bearers (RBs). Additionally the RRC may handle user mobility within the RAN, and additional services, e.g. location services. The RLC layer may perform segmentation, concatenation in sequence delivery, repetition, error recovery and other functions in order to exchange Service Data Units (SDUs) between the eNB an the UE entity. The RLC layer may create Protocol Data Units (PDUs) that use a sequence number in order to allow the re-ordering, and the detection of lost or re-transmitted PDUs. The MAC layer may control the access to the transmission resources. The physical layer may provide an information transfer service to an upper layer by using various radio transmission techniques.

In the E-UTRAN, the AGW may perform functions of a paging origination, a LTE-IDLE state management, a ciphering of the user plane, supporting a Packet Data Convergence Protocol (PDCP) function, a System Architecture Evolution (SAE) bearer control, and a ciphering and integrity protection of Non-Access Stratum (NAS) signalling.

The functions located in the aGW will be briefly described as follows: the function of 'SAE Bearer Control' may provide the UTRAN to construct and to maintain a radio access bearer (RAB) for communication between the terminal and the core network. The core network may request end-to-end quality of service (QoS) requirements from the RAB, and the RAB may support the QoS requirements the core network has set. As such, by constructing and maintaining the RAB, the UTRAN may satisfy the end-to-end QoS requirements. The function of 'The Mobility Management Entity' may handle access data from the home database, and may maintain subscription data (e.g. allowed areas, etc.), may accept/deny UEs location in IDLE, may store UEs location (TA) in IDLE, may handle user identity confidentiality (TMSI) and so on. The Packed Data Convergence Protocol (PDCP) layer may be located above the RLC layer. The PDCP layer may be used to transmit network protocol data, such as the IPv4 or IPv6, efficiently on a radio interface with a relatively small bandwidth. The PDCP layer may reduce unnecessary control information used in a wired network, and may perform a function called header compression. In addition the PDCP layer may provide ciphering and integrity protection for the transmitted data.

Transport channels may be introduced in the wireless communications system in order to allow different types of quality of service for the transmission of information. The transport channel may provide a service to the MAC layer and may connect to the physical layer. The different transport channels may be introduced in the LTE as followings: first, types of downlink transport channels can be described as follows; 1. Broadcast Channel (BCH) is characterised by: a) fixed, pre-defined transport format, and b) requirement to be broadcast in the entire coverage area of the cell 2. Downlink Shared Channel (DL-SCH) is characterised by: a) support for HARQ, b) support for dynamic link adaptation by varying the modulation, coding and transmit power, c) possibility to be broadcast in the entire cell, d) possibility to use beamforming, e) support for both dynamic and semi-static resource allocation, support for UE discontinuous reception (DRX) to enable UE power saving, and g) support for MBMS transmission (FFS) 3. Paging Channel (PCH) is characterised by: a) support for UE discontinuous reception (DRX) to enable UE power saving (DRX cycle is indicated by the network to the UE), b) requirement to be broadcast in the entire coverage area of the cell, and c) mapped to physical resources which can be used dynamically also for traffic or other control channels, and 4. Multicast Channel (MCH) is characterised by: a) requirement to be broadcast in the entire coverage area of the cell, b) support for combining of MBMS transmission on multiple cells (the exact combining scheme is FFS), and c) support for semi-static resource allocation (e.g., with a time frame of a long cyclic prefix). Also, types of uplink transport channels can be described as follows; 1. Uplink Shared Channel (UL-SCH) characterised by: a) possibility to use beam-forming; b) support for dynamic link adaptation by varying the transmit power and potentially modulation and coding, c) support for HARQ, and d) support for both dynamic and semi-static resource allocation and 2. Random Access Channel(s) (RACH) is used normally for initial access to a cell, and the RACH is characterised by: a) limited data field, and b) collision risk.

The UEs may receive system information before the UE (i.e., terminal) accesses a cell in a mobile communication system. This system information may contain information that is used by the UEs in an Idle state (i.e. when no context exists between the UE and the eNB) and in a connected state. For exemplary purpose only, the main system information may be sent on the BCCH logical channel which is mapped on the P-CCPCH (primary Common Control Physical Channel). Also, specific system information blocks may be sent on the FACH channel. When the system information is sent on FACH, the UE may receive the configuration of the FACH either on the BCCH that is received on P-CCPCH or on a dedicated channel. Here, the P-CCPCH may be sent using the same scrambling code as the P-CPICH (primary common pilot channel) which is the primary scrambling code of the cell. The spreading code that is used by the P-CCPCH may have a fixed SF (spreading factor) of 256 and the spreading code number may be one. The UE may know about the primary scrambling code either by information sent from the network on system information of neighboring cells that the UE has read (i.e., by messages that the UE has received on the DCCH channel) or by searching for the P-CPICH (which is always sent using the fixed SF 256 and the spreading code number 0 with a fixed pattern).

The system information may include information on neighboring cells, configuration of the RACH (Random Access Channel) and FACH (Forward Access Channel) transport channels, and the configuration of MICH (MBMS Indicator Channel) and MCCH (Multicast Control Channel) which are channels that are dedicated channels for the MBMS (Multimedia Broadcast/Multicast Service) service. It may be camping (in idle mode) whenever the UE changes the cell, or the UE may need to verify whether it has valid system information when the UE has selected the cell (in CELL_FACH, CELL_PCH or URA_PCH state). The system information may be organized in SIBs (system information blocks), a MIB (Master information block) and scheduling blocks. The MIB may be sent very frequently and may give or provide timing information of the scheduling blocks and the different SIBs. For SIBs that are linked to a value tag, the MIB may contain information on the last version of a part of the SIBs. The SIBs may be linked to an expiration timer if the SIBs are not linked to a value tag. Here, if the time of the last reading of the SIB is bigger than this timer value, the SIBs linked to an expiration timer may become invalid and may need to be reread. Also, the SIB s linked to a value tag may be valid if they have the same value tag as the one broadcast in the MIB. Each block may include an area scope of validity (i.e., Cell, Public Land Mobile Network (PLMN), equivalent PLMN) which signifies on which cells the SIB is valid. For example, a SIB with area scope "Cell" may be valid only for the cell in which it has been read. A SIB with area scope "PLMN" may be valid in the whole PLMN. A SIB with the area scope "equivalent PLMN" may be valid in the whole PLMN and equivalent PLMN.

The UEs may read the system information when they are in idle mode, CELL_FACH state, CELL_PCH state or in URA_PCH state of the cells (i.e., cell that the UE has selected, cell that the UE is camping on). The UEs may receive information of neighboring cells on the same frequency, different frequencies and different RAT (Radio access technologies). By doing this, the UE may know which cells are candidate for cell reselection. In a CELL_DCH state, the UE may know about the different radio links other than the UE currently use. In this case, it may increase the complexity for the UE to read additional channels such as the BCCH channels. Therefore the information of neighboring cells may be received in a dedicated message from the RNC, and only for some very specific functions. However, it may be possible that UEs read system information sent on the P-CCPCH channel or other transport channels in the CELL_DCH state.

Figure 2:
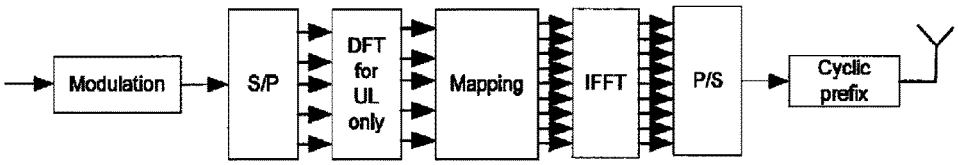
FIG. 2 shows an exemplary structure of an OFDM transmission.

The LTE (Long Term Evolution) may be based on OFDM (Orthogonal Frequency Division Multiplexing). FIG. 2 shows an exemplary transmitter of an OFDM scheme.

As illustrated in the FIG. 2, an input signal (symbols) may be modulated using a QAM modulation. The stream of modulated signal may be converted in a parallel complex bit-stream. Then, the bit-stream may be passed through a Discrete Fourier conversion block. After the mapping of the bits to the relevant frequencies, a vector may be fed into the Inverse Fast Fourier transmission block. Here, the parallel to serial conversion block may create a complex signal. A cyclic prefix may be added to the symbol in order to handle a multi-path transmission. The output signal after each IFFT may be called an OFDM symbol.

Figure 3:
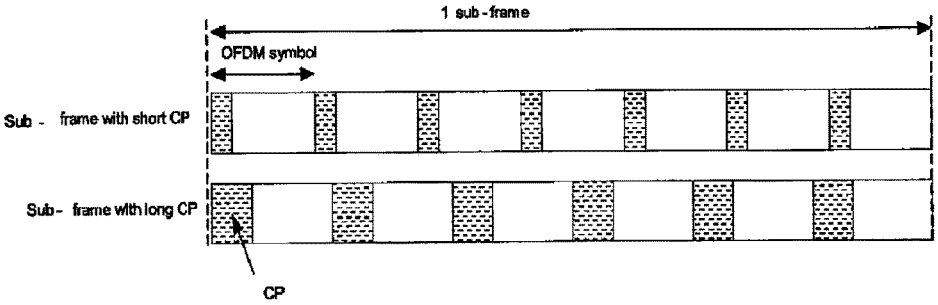
FIG. 3 shows an exemplary structure of an OFDM subframe structure.
Figure 4:
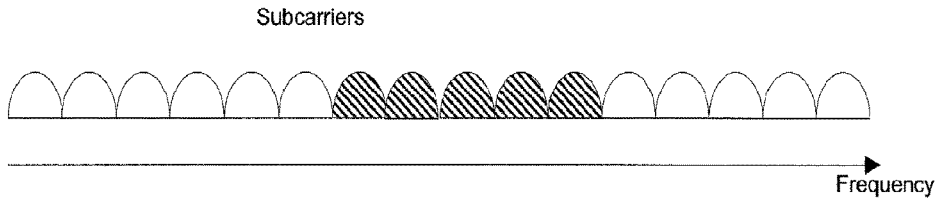
FIG. 4 shows an exemplary diagram illustrating subcarriers in transmission bandwidth.

Several OFDM symbols may be grouped together in order to form a sub-frame as illustrated in FIG. 3. The high bit-rate stream may be converted in several parallel bit-rate streams with lower data rate. Thus, each stream uses a smaller bandwidth and each stream is more robust for a frequency selective fading and multi-paths. Here, as long as the sub-carriers are transmitted with the same sub-carrier spacing, it may be possible that the UE receives only parts of the complete transmission bandwidth as shown in FIG. 4. (i.e., shaded and un-shaded parts show the sub-carriers that are transmitted, and the shaded part shows the sub carriers that are only received). Thus, the bandwidth for reception and transmission may be differently used.

The LTE system may be designed such that it can operate in many different bandwidths (e.g. 20 MHz, 10 MHz, 5 MHz, 2.5 MHz, and 1.25 MHz). Thus, the UE may not know about the bandwidth used by a cell when a UE attempts to find out the existence of a cell. The UE may transmit a reference signal, which can be transmitted through a Synchronization channel (SCH), in order to allow the UE to find out the existence of the cell. Here, the reference signal may be transmitted on the SCH using a part of the total bandwidth in order to allow the UE to discover any cell. Therefore, the UE may only need to search for a limited number of SCH bandwidths.

Also, the UE may determine the existence of a cell and may acquire sub-frame synchronization by searching for the SCH channel. In order to allow the UE to receive more information on the cell characteristics, it may be necessary for the UE to receive broadcast information which is carried on the BCH channel. Such a BCH channel may be transmitted on a limited or part of the total bandwidth just like in the case of the SCH channel.

Figure 5:
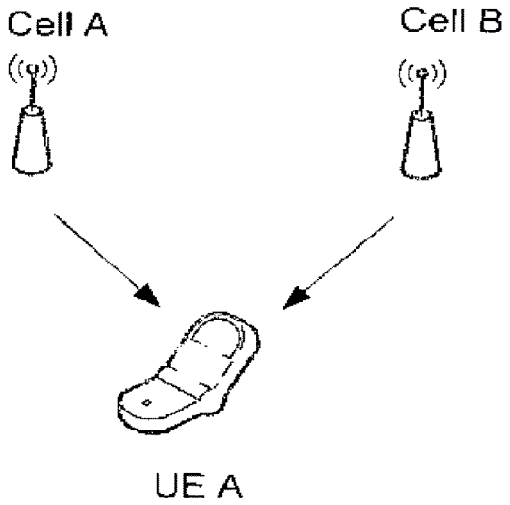
FIG. 5 shows an exemplary diagram illustrating a reception of several cells by a UE.

In a multi-cell environment, the UE may receive different signals (cells) permanently from several base stations. In this case, the transmission of the different signals may be not synchronized when the UE decodes the transmission of one cell (e.g. the transmission of signal of a cell B may create interference with a cell A, and may increase the probability of false reception by the cell A). In order to increase the probability of correct reception, the cells may transmit the same signal in a time aligned manner with a coordination of their transmission, such that the UE may jointly decode the received signal from both cells as shown in FIG. 5. This type of reception manner can be called soft combining because the UE may combine the received signal of both cells during the reception phase. The signals of the different cells are not perceived as interference, and thus soft combining may increase the quality of the signal received by the UE. Although many other different techniques may exist for the soft combining, this scheme may require a very strict or tight synchronization between the cells. When the OFDM is used as a modulation scheme, the time synchronization may need to be in the order of a length of a cyclic prefix in order to handle a constructive interference.

A selective combining may be used if a tight level of synchronization is not possible. The selective combining method can be discriminated to the soft combining, as the selective combining method allows the UE to receive the signals sent from several base stations independently. Although the two cells may not transmit the same signal, the UE may know that the two cells transmit the same data. Thus, by receiving the transmission of signals of both cells, it may be possible to receive data (i.e., RLC PDUs) correctly from one cell even though other data has not been correctly received by another cell. As such, the selective combining method may increase the overall quality of the data reception [i.e., faster transmission]. Because the selective combining may be performed at RLC level, RLC sequence numbers may be used in order to re-order the Protocol Data Units (PDUs) received from the different cells involved in the selective combining.

Figure 6:
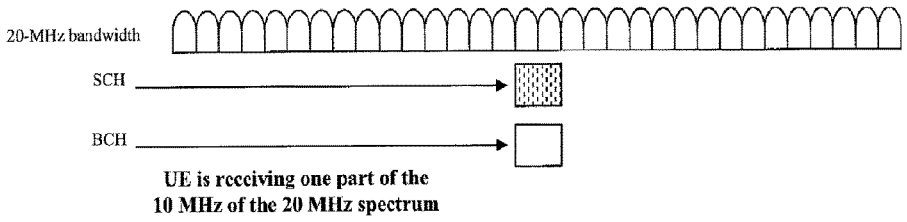
FIG. 6 shows an exemplary diagram illustrating 10 MHz UE in 20 MHz spectrum in accordance with a present disclosure.

Due to the fact that a global downlink capacity [i.e., bandwidth] of a cell is bigger or larger than the reception capacity of the UE, the bandwidth of the UE may not be utilized or used for a maximum downlink bandwidth. (i.e., only part of total downlink bandwidth is used) Usually, the maximum bandwidth for a cell is set to 20 MHz in the LTE system, and the UE's minimum reception bandwidth is set to 10 MHz. Thus, the UE with 10 MHz receiver may tune its receiver to a leftmost or a rightmost part of the spectrum as shown in FIG. 6. Therefore, data or signals on the BCH or the SCH may not be correctly received if such data or signals are transmitted on a center frequency of the downlink bandwidth.

This disclosure may provide a method or system such that the system information is grouped or classified in different types according to the characteristics of the system information, and the system information may be sent on channels with specific functions to allow the optimization of the resource usage and the improved reception by the UE. Here, the system information may be grouped in primary system information and secondary system information as shown in Table 1. The primary system information may be composed of information that is essential for further reception of the secondary system information. The secondary system information may be further devised in cell-level system information and PLMN-level system information, depending on whether a content of the information is a cell specific [i.e., information is only valid in a specific cell] or same content for different cells of same PLMN [i.e., information is valid in the entire network]. Also, some types of system information may change frequently due to the radio communication environment, while other types of system information do not change as frequently. As such, the Cell-level system information may be further devised in dynamic information and semi-static system information depending on whether the content of the information changes frequently (dynamic) or not frequently (semi-static).

TABLE 1

| Different types of system information | | |
|---|---|---|
| Primary System Information | | |
| Secondary System Information | Cell-level | Semi-static<br>Dynamic |
| | PLMN-level | |

Here, the primary system information may be sent on a transport channel with fixed scheduling, such as the BCH, whereas the secondary system information may be transmitted on a transport channel with flexible scheduling, such as DL-SCH. The PLMN-level system information may be transmitted with a coordination of neighboring cells such that the selective combining or the soft combining can be applied. The BCH may be transmitted in a way that the UEs can receive a rightmost, leftmost, or center part of a total downlink bandwidth (i.e., 20 MHz spectrum) if the UEs have a capability to receive only limited bandwidths (i.e. 10 MHz).

The system information may be categorized in detail, as shown in Table 2.

TABLE 2

| Different types of system information | | | |
|---|---|---|---|
| Primary System Information | | | PLMN information (e.g. MIB)<br>Scheduling information of BCCH blocks, i.e. Secondary system information blocks (e.g. R6 MIB or SB) |
| Secondary System Information | Cell-level | Semi-static | Cell selection/re-selection information (e.g. R6 SIB3)<br>Semi-static common channel information (e.g. R6 SIB5/6)<br>Measurement control information (e.g. R6 SIB11/12)<br>Cell-level Location Service information (e.g. R6 SIB15 except SIB15.3)<br>Information on PLMN identities of neighbouring cells (e.g. SIB18) |
| | | Dynamic | Dynamic common channel information (e.g. R6 SIB7, SIB14, SIB17) |
| | PLMN-level | | NAS system information (e.g. R6 SIB1)<br>Information on UE timers/counters (e.g. R6 SIB1)<br>PLMN-level Location Service information (e.g. R6 SIB15.3)<br>Pre-defined Configurations (e.g. R6 SIB16) |

When a UE is located or camped on a cell, the UE may read the primary system information of the Table 2 immediately after a synchronization process by synchronization channel. The primary system Information may have a cell specific and semi-static characteristic. The primary system information may contain scheduling information of the secondary system information blocks. (e.g., R6 MIB or SB) Thus, after reading the primary system information, the UE can read the secondary system information block on a scheduled time and frequency. The cell-level secondary system information of the Table 2 is grouped as the cell-specific. Therefore, when the UE moves to a new cell (i.e., different than current cell), the UE may read the cell-level secondary system information in the new cell regardless of reading of the cell-level secondary system information of a previous cell.

The dynamic cell-level secondary system information of the Table 2 may include fast changing parameters such as interference. It may be used for a common channel such as Random Access Channel (RACH). Here, except for the dynamic cell-level secondary system Information, all of the cell-level secondary system information of the Table 2 may be considered as semi-static. (i.e., content is not frequently changed) The PLMN-level secondary system information of Table 2 may be not cell-specific, but common to multiple cells in PLMN area. Thus, if the UE, which has read the PLMN-level secondary system information in a previous cell moves to a new cell and the PLMN-level secondary system information has not been modified, the UE may not need to read the same PLMN-level secondary system information in a new cell. Here, the PLMN-level secondary system information usually has semi-static characteristic.

For the system information in a LTE system, a MIB may use a fixed resource because the UE may not presumably acquire any control information before receiving the MIB in a cell. However, eNB can schedule SIBs (i.e., SIBs on SCH) within a specific Transmission Time Intervals (TTI) indicated by the MIB. If a certain SIB is scheduled within a certain TTI, control information of the TTI may indicate existence of a SIB in the TTI and may schedule a time or frequency of the SIB. As such, the eNB may have more flexible size of the SIB within a range of minimum UE capability. Also, the eNB may have more flexibility of SCH scheduling. In details, the UE may receive the MIB at the fixed downlink (DL) resource (e.g. time/code/frequency). If the MIB includes long-term scheduling information of SIB transmissions and the UE has a specific SIB, the UE may receive a DL control channel for one or more TTIs indicated by the long-term scheduling information of the SIB in order to acquire a short-term scheduling of the SIB. And then, if the UE find that the short-term scheduling information at the TTI on the DL control channel indicates the existence of the SIB in this TTI and the UE successfully receives the short-term scheduling information of the SIB, the UE may receive the SIB at the DL resource on a DL broadcast channel (e.g. time and frequency of the DL broadcast channel) indicated by the short-term scheduling of the SIB. Afterwards, UE may operate based on the received SIB.

The BCH channel may have a globally fixed configuration for UEs to decode without any control information. Thus, the primary system information may be broadcast on the BCH. Here, the secondary system information may be broadcasted on DL SCH. In this case, a configuration of the DL SCH on a BCCH may be carried on the primary system information on the BCH. A second layer (L2) may be able to differently handle transmissions of primary and secondary system information (e.g. segmentation/concatenation). Therefore, different BCCH logical channels may be configured for primary and secondary system information. As seen in the Table 2, a SIB1, a SIB15.3 and a SIB16 may across several cells in the PLMN area. Here, the SIB1 may contain NAS system information and a UE timer/counter, SIB15.3 Location Service information and SIB16 pre-defined configurations. In LTE system, when the SIB1 and SIB16 are broadcasted on the BCCH, combining techniques across several cells may be considered to transfer NAS system information, UE timer/counter and pre-defined configurations.

Usually, a soft combining may be considered better than a selective combining in terms of performance. Therefore, the soft combining may be applied to the PLMN-level system information like SIB1 and SIB 16 in a LTE system. As such, a first layer (L1) may provide a specific common pilot and long cyclic prefix for the SIB1 and SIB16. In addition, a synchronous time and/or frequency transmission of the specific system information between cells may need to be provided. Alternatively, the selective combining may be applied to the PLMN-level system information like SIB1 and SIB16 in the LTE system. Here, the first layer (L1) may not need to consider the specific common pilots, the length of cyclic prefix and synchronous transmissions. However, a UE should decode multiple cells to selectively combine BCCH channels of multiple cells. Moreover, the UE should apply duplication avoidance function in a second layer (L2). For this duplication avoidance function, an aGW may need to provide sequence numbers of the PLMN-level system information.

Figure 7:
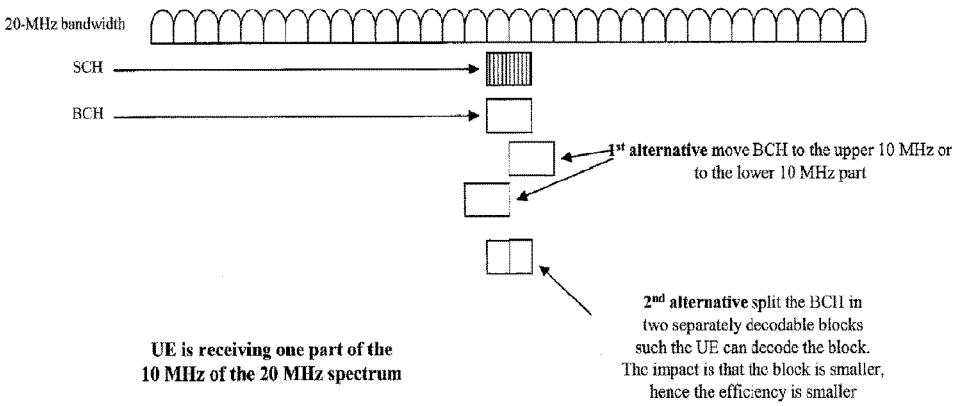
FIG. 7 shows an exemplary diagram illustrating a reception of the BCH in the case of 20 MHz system bandwidth in accordance with a present disclosure.
Figure 8:
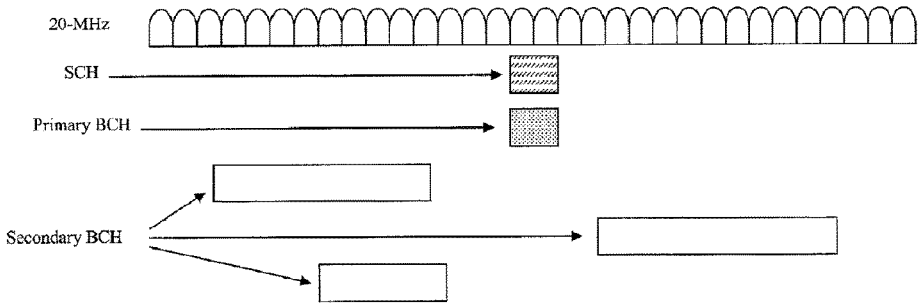
FIG. 8 shows an exemplary diagram illustrating a primary and a secondary BCH in accordance with a present disclosure.

The special case of 20 MHz system bandwidth where a UE is receiving one part of the carriers is shown in FIG. 7. As illustrated in FIG. 7, the UE, which is allocated to a right half of a bandwidth, may not able to receive a BCH correctly in the case that the BCH is coded and positioned on a center frequency. Thus, in order to allow that the UE can receive the BCH in all cases, the BCH should be transmitted in a different manner. Here, an alternative 1 or an alternative 2 may be proposed. In the alternative 1, the BCH blocks may move toward the upper 10 MHz or the lower 10 MHz, as shown in FIG. 7. In alternative 2, the BCH may be split in two blocks that can be received independently. In this case, the UE may be tuned to receive both blocks, as the UE may receive half of the BCH transmissions and receive the other half part of the BCH transmission. Therefore, the UE may still be able to receive the BCH, although this UE may not receive the BCH as fast as other UEs.

Here, system information may be split in primary system information and secondary system information, as BCH should be transmitted in the same way for different system bandwidths. The primary system information may comprise a system bandwidth, scheduling information of secondary system information and other basic information (e.g. the MIB in R99). The primary system information may be transmitted as described above on the BCH channel (which could also be called a primary BCH). The Primary BCH channel may have a fixed configuration. (i.e., depending on the configuration of the SCH) The secondary system information may comprise other system information blocks, and the second system information may be transmitted on a secondary BCH or a DL-SCH. Here, theses channels may have a flexible configuration that every UE can support with minimum UE capability. It may be possible that the configuration may be provided on the primary system information. If a cell supports a bandwidth wider than 1.25 MHz, the secondary system information may be sent on wider bandwidth than 1.25 MHz, or up to the minimum UE receiver bandwidth. Thus, the secondary system information may be transmitted at any subcarrier and time based on the scheduling information contained in the primary system information.

This disclosure may provides a method of broadcasting system information in a mobile communication system, the method comprising: classifying the system information based on characteristics of the system information; and transmitting the classified system information via at least one of a first type of channel and a second type of channel, wherein the first type of channel is a statically scheduled channel and the second type of channel is a flexibly scheduled channel, wherein the first and second type of channels are transport channels, the system information may be classified into primary system information and secondary system information, the primary system information includes at least one of Public Land Mobile Network (PLMN) information and scheduling information of the secondary system information, the system information is classified into cell-level system information and PLMN-level system information, the system information is the cell-level system information when a content of the system information is used or valid to a specific cell, the system information is the PLMN-level system information when a content of the system information is commonly used or valid to multiple cells within a PLMN area, the cell-level system information is either dynamic system information or semi-static system information, the cell-level system information is the dynamic system information when a content of the secondary system information is frequently changed, the cell-level system information is the semi-static system information when a content of the secondary system information is not frequently changed, the primary system information is transmitted via the first type of channel and/or the secondary system information is transmitted via the second type of channel, and the first type of channel is a Broadcast Channel (BCH) and the second type of channel is a Downlink Shared Channel (DL-SCH).

It can be also said that this disclosure provide a method of receiving system information in a mobile communication system, the method comprising: receiving the system information via at least one of a first type of channel and a second type of channel, wherein the first type of channel is a statically scheduled channel and the second type of channel is a flexibly scheduled channel, the received system information was classified by a network entity according to characteristics of the system information, the first and second type of channels are transport channels, the system information was classified into primary system information and secondary system information, the primary system information includes at least one of PLMN information and scheduling information of the secondary system information, the system information was classified into cell-level system information and PLMN-level system information, the cell-level system information is either dynamic system information or semi-static system information, the primary system information is received via the first type of channel and/or the secondary system information is received via the second type of channel, and the first type of channel is a Broadcast Channel (BCH) and the second type of channel is a Downlink Shared Channel (DL-SCH).

Here, this disclosure may provide a method of transmitting or receiving system information utilizing of not only the first and second channels but also utilizing of many other different types of channels. Although this disclosure is described in the context of mobile communications, this disclosure may also be used in any wireless communication systems using mobile devices, such as PDAs and laptop computers equipped with wireless communication capabilities (i.e. interface). Moreover, the use of certain terms to describe this disclosure is not intended to limit the scope of this disclosure to a certain type of wireless communication system. This disclosure is also applicable to other wireless communication systems using different air interfaces and/or physical layers, for example, TDMA, CDMA, FDMA, WCDMA, OFDM, EV-DO, WiMax, Wi-Bro, etc.

The exemplary embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium may be accessed and executed by a processor. The code in which exemplary embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of this disclosure, and that the article of manufacture may comprise any information bearing medium known in the art.

Any reference in this specification to "one embodiment," "an embodiment," "example embodiment," etc., means that a particular feature, structure, or characteristic described in connection with the embodiment is included in at least one embodiment of this disclosure. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

As this disclosure may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

The invention claimed is:

1. A method of broadcasting system information in a Long Term Evolution (LTE) mobile communication system, the method comprising:

classifying the system information into a first portion and a second portion based on characteristics of the system information, the first portion comprising [scheduling] *Master Information Block* (*MIB*) information;

broadcasting the first portion of the system information via a first type of common transport channel; and transmitting the second portion of the system information via a second type of common transport channel based on the [scheduling] *MIB* information, wherein the first type of common transport channel is a Broadcast Channel (BCH) which is a statically scheduled common transport channel, wherein the second type of common transport channel is a Downlink Shared Channel (DL-SCH) which is a flexibly scheduled common transport channel, [and]

wherein broadcasting the first portion of the system information comprises broadcasting the first portion using not more than half of a cell bandwidth of the LTE mobile communication system,

*wherein the cell bandwidth of the LTE mobile communication system equals 20 MHz, and*

*wherein the first portion of the system information is broadcasted using not more than half of the 20 MHz cell bandwidth.*

2. The method of claim 1, wherein the *first portion of the* system information is [classified into] primary system information and *the second portion of the system information is* secondary system information.

3. The method of claim [2] *1*, wherein the [primary system] *MIB* information includes [at least] *one of* Public Land Mobile Network (PLMN) information or [the] scheduling information of the secondary system information.

[4. The method of claim 1, wherein the system information is classified into cell-level system information and PLMN-level system information.]

[5. The method of claim 4, wherein the system information is the cell-level system information when a content of the system information is used or valid to a specific cell.]

[6. The method of claim 4, wherein the system information is the PLMN-level system information when a content of the system information is commonly used or valid to multiple cells within a PLMN area.]

[7. The method of claim 4, wherein the cell-level system information is either dynamic system information or semi-static system information.]

[8. The method of claim 7, wherein the cell-level system information is the dynamic system information when a content of the cell-level system information is frequently changed.]

[9. The method of claim 7, wherein the cell-level system information is the semi-static system information when a content of the cell-level system information is not frequently changed.]

[10. The method of claim 2, wherein at least the primary system information is transmitted via the BCH or the secondary system information is transmitted via the DL-SCH.]

11. A method of receiving system information in a Long Term Evolution (LTE) mobile communication system, the method comprising:

receiving a broadcast of a first portion of the system information via a first type of common transport channel, the first portion comprising [scheduling] *Master Information Block* (*MIB*) information; and receiving a second portion of the system information via a second type of common transport channel based on the [scheduling] *MIB* information, wherein the first type of common transport channel is a Broadcast Channel (BCH) which is a statically scheduled common transport channel, wherein the second type of common transport channel is a Downlink Shared Channel (DL-SCH) which is a flexibly scheduled common transport channel, [and]

wherein the broadcast of the first portion of the system information uses not more than half of a cell bandwidth of the LTE mobile communication system,

*wherein the cell bandwidth of the LTE mobile communication system equals 20 MHz, and*

*wherein the first portion of the system information is broadcasted using not more than half of the 20 MHz cell bandwidth.*

12. The method of claim 11, wherein the *first portion of the* system information [was classified into] *is* primary system information and *the second portion of the system information is* secondary system information.

13. The method of claim [12] *11*, wherein the [primary system] *MIB* information includes [at least] *one of* Public Land Mobile Network (PLMN) information or [the] scheduling information of the secondary system information.

[14. The method of claim 11, wherein the system information was classified into cell-level system information and PLMN-level system information.]

[15. The method of claim 14, wherein the cell-level system information is either dynamic system information or semi-static system information.]

[16. The method of claim 12, wherein at least the primary system information is received via the BCH or the secondary system information is received via the DL-SCH.]

[17. The method of claim 1, wherein the cell bandwidth of the LTE mobile communication system equals 20 MHz, and wherein the first portion of the system information is broadcast using not more than half of the 20 MHz cell bandwidth.]

[18. The method of claim 11, wherein the cell bandwidth of the LTE mobile communication system equals 20 MHz, and wherein the broadcast of the first portion of the system information uses not more than half of the 20 MHz cell bandwidth.]

* * * * *